United States Patent
Wu et al.

(10) Patent No.: US 11,222,357 B2
(45) Date of Patent: Jan. 11, 2022

(54) METHOD AND SYSTEM FOR GENERATING A SCHEDULE DATA STRUCTURE FOR PROMOTIONAL DISPLAY SPACE

(71) Applicant: ORACLE INTERNATIONAL CORPORATION, Redwood Shores, CA (US)

(72) Inventors: Su-Ming Wu, Waltham, MA (US); Mark E. Ferguson, Columbia, SC (US); Olga Pak, Columbia, SC (US); Olga Perdikaki, Columbia, SC (US)

(73) Assignee: Oracle International Corporation, Redwood Shores, CA (US)

( * ) Notice: Subject to any disclaimer, the term of this patent is extended or adjusted under 35 U.S.C. 154(b) by 998 days.

(21) Appl. No.: 15/583,328

(22) Filed: May 1, 2017

(65) Prior Publication Data
US 2017/0323333 A1 Nov. 9, 2017

Related U.S. Application Data

(60) Provisional application No. 62/332,668, filed on May 6, 2016.

(51) Int. Cl.
*G06Q 30/02* (2012.01)
*G06F 16/24* (2019.01)
(Continued)

(52) U.S. Cl.
CPC ......... *G06Q 30/0247* (2013.01); *G06F 16/24* (2019.01); *G06Q 10/06311* (2013.01); *G06Q 30/00* (2013.01)

(58) Field of Classification Search
None
See application file for complete search history.

(56) References Cited

U.S. PATENT DOCUMENTS

2006/0277104 A1* 12/2006 Overhultz .............. G06Q 30/02
705/14.41
2008/0208719 A1 8/2008 Sharma et al.
(Continued)

FOREIGN PATENT DOCUMENTS

CA 2794679 A1 1/2013

OTHER PUBLICATIONS

Patent Cooperation Treaty (PCT) International Search Report and Written Opinion in co-pending PCT International Appl. No. PCT/US2017/030553 (International Filing Date of May 2, 2017) dated Jun. 13, 2017 (12 pgs.).

*Primary Examiner* — Alan Torrico-Lopez
(74) *Attorney, Agent, or Firm* — Kraguljac Law Group, LLC

(57) ABSTRACT

Systems, methods, and other embodiments associated with computing and generating schedule data structures for items in a display are described. In one embodiment, a method includes accessing a sales data structure corresponding to a store and analyzing sales records for items associated with subcategories to calculate a subcategory profit contribution score for each subcategory. The method may also include selecting a first subcategory from the subcategories as a candidate subcategory of items and analyzing the sales records to calculate an item profit contribution score for each of the items assigned to the candidate subcategory. A first item is selected from the candidate subcategory to be placed on a promotional display space, based upon the item profit contribution score of the first item. A schedule data structure is generated that assigns the first item to the promotional display space.

20 Claims, 8 Drawing Sheets

(51) Int. Cl.
*G06Q 30/00* (2012.01)
*G06Q 10/06* (2012.01)

(56) References Cited

U.S. PATENT DOCUMENTS

| | | |
|---|---|---|
| 2012/0246026 A1 | 9/2012 | Xu et al. |
| 2012/0246028 A1* | 9/2012 | Xu .................... G06Q 30/0641 |
| | | 705/26.63 |
| 2013/0339083 A1* | 12/2013 | Baier .................... G06Q 30/02 |
| | | 705/7.29 |
| 2015/0081424 A1* | 3/2015 | Letham ............. G06Q 30/0276 |
| | | 705/14.46 |
| 2016/0335697 A1* | 11/2016 | Bawri ................ G06Q 30/0629 |
| 2016/0337276 A1* | 11/2016 | Nelson ................... H04L 51/046 |
| 2017/0158430 A1* | 6/2017 | Raizer .................... B65G 1/137 |
| 2019/0095507 A1* | 3/2019 | Elisseeff ................ G06N 3/006 |

* cited by examiner

SALES DATA STRUCTURE — 130

| ITEM (305) | PRODUCT CATEGORY (310) | SUBCATEGORY (315) | SALES (320) | TIME IN PROMOTIONAL DISPLAY (325) |
|---|---|---|---|---|
| ITEM (1) | SOFT DRINK | COLA | 53 | 1/1/17-1/7/17 |
| ITEM (2) | SOFT DRINK | GINGER ALE | 298 | 1/8/17-1/14/17 |
| ITEM (3) | BEER | CRAFT | 752 | 1/16/17-1/21/17 |
| ITEM (4) | BEER | PREMIUM | 120 | 1/22/17-1/28/17 |
| ITEM (5) | DRESSING | ITALIAN | 32 | 1/22/17-1/28/17 |

FIG. 3

METHOD AND SYSTEM FOR GENERATING A SCHEDULE DATA STRUCTURE FOR PROMOTIONAL DISPLAY SPACE

CROSS REFERENCE RELATED APPLICATION

This disclosure claims priority to U.S. Provisional Application Ser. No. 62/332,668, filed on May 6, 2016, entitled "Computerized System and Method for Optimization of Promotional-Display Space For Retailers", which is incorporated herein by reference in its entirety.

BACKGROUND

A retailer may offer various items for sale in physical stores. The items may be allocated to shelves in aisles throughout the stores. Each aisle in a store or each portion of an aisle may be stocked with items that are related to one another, and customers may come to associate each aisle or each portion of each aisle with certain types of items. To facilitate the ability of repeat customers to find items and prevent confusion, items stocked in typical portions of the aisles, such as shelf space within the aisles, may thus be kept in the same general area over weeks, months or even years.

In addition to the typical portions of the aisles, the retailer may allocate some items to promotional display spaces in the store. The area available in promotional display spaces may be substantially less, in each store, than the area available in the aisles. The promotional display spaces may also be more visible to more customers of the store, and may thus provide more visibility to any items allocated to a promotional display space.

In order to improve use of the promotional display spaces, increase profits, move inventory, and optimize the use of network bandwidth, processing and storage sources, and/or overall system load across the computers of a store across its physical stores (branches) when identifying, retrieving and/or processing data used to make selections for display spaces, it is desirable to efficiently select items to allocate to the promotional display spaces.

Unfortunately, typical existing retailer techniques are limited to selecting items for all display spaces and across all stores in a same manner, without taking into account other relevant criteria. Thus, retailers and customers alike are limited in their benefit from the promotional display spaces.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates an embodiment of a sales data structure.

DETAILED DESCRIPTION

Computerized systems and methods are described herein that provide for constructing a schedule data structure that assigns one of a plurality of items, such as a physical product or a physical representation of a service, to one of a plurality of promotional display spaces. In one embodiment, the plurality of promotional display spaces are maintained in a store by a retailer, such as a grocer. The plurality of promotional display spaces in the store often have, in combination, less space for the stocking of items than typical display spaces in the same store. The promotional display spaces may be positioned at the end of aisles and next to checkout lanes. Accordingly, the promotional display spaces are seen more often by customers of the store than the typical display spaces.

The plurality of promotional display spaces may be stocked with items selected from a plurality of items (stock keeping units) sold by the store. The plurality of items have various levels of sales at different times, and thus may be associated with various levels of benefit (profit) to the retailer at different times. When a retailer attempts to select an item to assign to a promotional display space, the retailer may rely upon the judgement of an employee at the store to select the item from thousands of items sold at the store. Alternatively, the retailer may rely upon systems that assign items to display spaces without distinguishing between typical display spaces and promotional display spaces, and without distinguishing between the experiences of stores of a same retailer at different locations. Such systems may use a substantial amount of processing power, networking bandwidth and memory to gather and process data from a plurality of stores (branches) to generate imprecise recommendations. Thus, in order to optimize selection of items for each promotional display space from the thousands of items sold by the retailer, store-specific sales records may need to be analyzed, and distinctions between the sales performance of items in the promotional display spaces and items in the typical display spaces may need to be considered.

Figure 1:
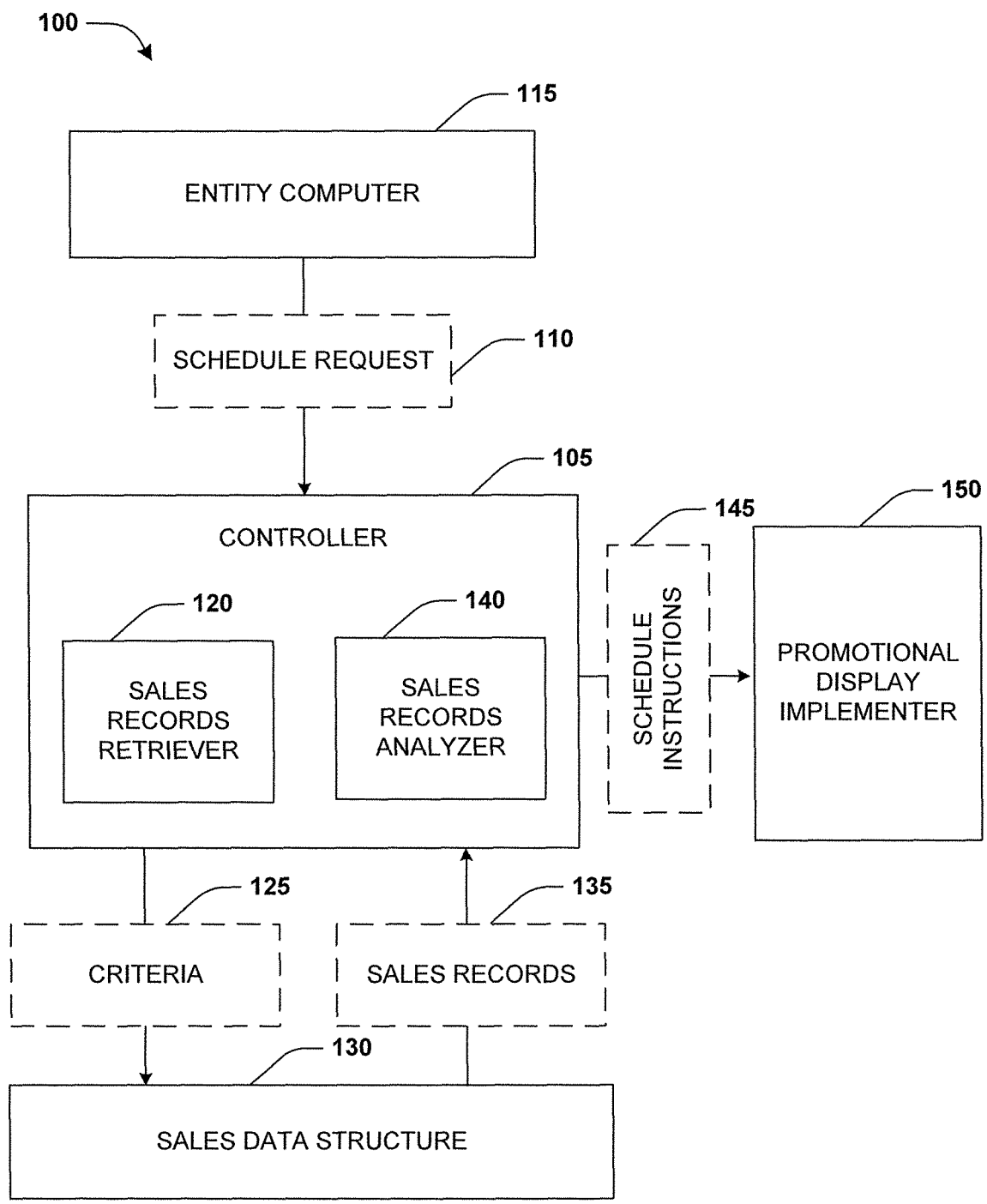
FIG. 1 illustrates an embodiment of a system associated with assigning an item from a plurality of items to a promotional display space.

With reference to FIG. 1, one embodiment of a computerized system 100 associated with generating a schedule data structure for promotional display spaces in a store is illustrated. The system 100 includes a controller 105, which may be configured to execute on a computer. The controller 105 may be initiated based upon a schedule request 110 being received from an entity computer 115, such as a computer of a manager of the store that is requesting a schedule data structure representative of a schedule that assigns items to the promotional display spaces be generated. For example, the store may be a grocery store, and items that can be assigned to the promotional display spaces include groceries such as beverages, produce, coffee, etc. The controller 105 may receive the schedule request 110 over a network connection.

A sales records retriever 120 is configured to analyze the schedule request 110 and identify data within that identifies the store (in a manner that distinguishes the store from other stores of the same retailer), information about the capacity of the store and information about the schedule desired. In some examples, the information about the capacity of the store includes a number of available promotional display spaces in the store. For example, the store may have a first number of available promotional display spaces at a first time, such as winter, while the same store may have a second number of available promotional display spaces at a second time, such as summer. In some examples, the information about the schedule desired includes a time frame (1 month, 3 months, 1 year, etc.) of the schedule and units of time (daily, weekly, monthly, etc.) to be used for assignments in the schedule.

The controller 105 utilizes the sales records retriever 120 to generate criteria 125 for items to be considered for the schedule request 110. The criteria 125 may specify the store for which the schedule is being created and a time frame of sales records at the store that need to be considered.

The criteria 125 is used to analyze a sales data structure 130 in order to identify data records to be considered for the schedule request 110. The sales data structure 130 includes data records for a plurality of items sold by the store and a history of sales of the plurality of items at the store. In some examples, the data records include a quantity, price, cost, profit and/or date of a sale of each item, and a record of date(s) of placement of each item in promotional display spaces. In some examples, the data records indicate that each of the items sold by the store is assigned to one of a plurality of subcategories. The data records may further indicate that each subcategory belongs to one of a plurality of product categories. For example, the data records may specify that a first item is assigned to a first subcategory, the first subcategory belongs to a first product category, a second item is assigned to a second subcategory, and the second subcategory belongs to a second product category. The controller 105 uses the sales data structure 130 to generate sales records 135 for the items sold by the store and meeting the criteria 125.

In some examples, the sales data structure 130 is specific to items sold by the store of the retailer (while a different sales data structure, stored in a different location than the sales data structure 130, may be specific to items sold by a different store of the retailer). In some examples, first data records included in the sales data structure 130 and accessed/analyzed for the schedule request 110 are specific to items sold by the store of the retailer (while second data records included in the sales data structure 130 but not accessed/analyzed for the schedule request 110 may be specific to items sold by a different store of the retailer).

In some examples, the sales records 135 include data records that are retrieved from the sales data structure 130 and then rearranged into an optimized format, where each record in the sales record 135 may include a combination of two or more of an identifier of an item, an identifier of the store sales of the item over a block of time (a week), an indication of whether the item was placed on a promotional display space during the block of time, an average price paid for the item at the store during the block of time, and/or promotional instruments (discounts, coupons, flyers, advertisements, etc.) applicable to the item used during or temporally close to the block of time.

The controller 105 utilizes the sales records analyzer 140 to analyze the sales records 135 for the calculation of a subcategory profit contribution score for each of the subcategories relative to other subcategories. For example, a first subcategory profit contribution score is calculated for a first subcategory (fruits) based upon an increase in sales of items assigned to the first subcategory corresponding to the placement of those items in promotional display spaces, a second subcategory profit contribution score is calculated for a second subcategory (vegetables) based upon an increase in sales of items assigned to the second subcategory corresponding to the placement of those items in promotional display spaces, etc. In some examples, both subcategories may belong to a same (produce) product category, while in other examples, the subcategories may belong to different product categories. In some examples, a subcategory profit contribution score for a subcategory is calculated by predicting sales for each item of the subcategory in the absence of promotions and price reductions, calculating a lift (increase in sales) for each item of the subcategory based upon the predicted sales, and calculating the average increase in profit of each item in the subcategory based upon the lift.

It may be appreciated that in some examples, the calculation of the subcategory profit contribution score for each subcategory may involve an efficiency-optimizing calculation technique. For example, a raw subcategory score is calculated for a subcategory of a product category, and the raw subcategory scores corresponding to the product category (but not other product categories) are compared to one another. Merely one raw subcategory score and a corresponding subcategory are selected as a reference point for the product category based upon a comparison of the raw subcategory score to raw subcategory scores of other subcategories belonging to the product category. A relative subcategory score is then calculated for the selected subcategory based upon a comparison of the selected raw subcategory score with one or more other raw subcategory scores.

In this example, a first raw subcategory score (0.5) is calculated for the first subcategory (fruits) based upon the increase in sales of items (apples, oranges, etc.) assigned to the first subcategory corresponding to the placement of those items in promotional display spaces. A second raw subcategory score (0.8) is calculated for the second subcategory (vegetables) based upon the increase in sales of items (lettuce, tomatoes, etc.) assigned to the second subcategory corresponding to the placement of those items in promotional display spaces. The second raw subcategory score is selected as a reference point for the first product category (produce) based upon the second raw subcategory score being greater than the first raw subcategory score (or, alternatively in some examples, based upon the second raw subcategory score being less than the first raw subcategory score). In this example, a first relative subcategory score (second raw subcategory score−0.3) is calculated for the first subcategory based upon a comparison of (difference between) the first raw subcategory score and the second raw subcategory score. A similar series of calculations/comparisons may be performed to determine a third relative subcategory score (fourth relative subcategory score+0.1) for a third subcategory (vitamins) belonging to a second product category (pharmacy) and selected as the reference point for the second product category. In the example, the subcategory profit contribution score for the first subcategory is calculated based upon a comparison of the first relative subcategory score (second raw subcategory score−0.3) to the third relative subcategory score (and zero or more other relative subcategory scores). A similar series of calculations/comparisons may be performed to determine subcategory profit contribution scores for each subcategory of items sold by the store. This efficiency-optimizing calculation technique may allow for the calculation and use of profit contribution scores at increased speeds using fewer processing resources, RAM, and memory resources (by using/comparing relative values for each subcategory, rather than using/comparing absolute values for each subcategory).

With continued reference to FIG. 1, the controller 105 utilizes the sales records analyzer 140 to select a subcategory from the subcategories as a candidate subcategory of items to be placed on a promotional display space. For example, in response to determining that the subcategory profit contribution score of the first subcategory is greater (or, in some embodiments, lower) than other subcategory profit contribution scores calculated for other subcategories, and in response to determining that the first subcategory is not disqualified by one or more display optimization filters, the first subcategory is selected as the candidate subcategory.

The display optimization filters can include a first display optimization filter defining a threshold frequency for assigning items of a product category to one or more promotional display spaces, which can be applied to a promotional display history of the first product category (produce) to which the first subcategory belongs to determine whether the first display optimization filter disqualifies the first product category from being placed on the promotional display space. For example, the first display optimization filter could disqualify the first subcategory (fruits) in response to a determination that more than a threshold number of items belonging to the first product category (including fruits, but also vegetables) were placed in promotional display spaces in the store in a threshold period of time.

The display optimization filters can include a second display optimization filter defining a threshold frequency for assigning items of a subcategory to one or more promotional display spaces, which can be applied to a promotional display history of the first subcategory (fruits) to determine whether the second display optimization filter disqualifies the first subcategory from being placed on the promotional display space. For example, the second display optimization filter could disqualify the first subcategory (fruits) in response to a determination that more than a threshold number of items belonging to the first subcategory (fruits) were placed in promotional display spaces in the store in a threshold period of time.

The display optimization filters can include a third display optimization filter defining a capacity of promotional display spaces (available) in the store, which can be used to determine whether the third display optimization filter disqualifies the first product category from being placed on the promotional display space. For example, the third display optimization filter could disqualify the first subcategory (fruits) in response to determining that there are not enough available promotional display spaces available for the first subcategory, or in response to determining that a physical aspect (dimensions/area, temperature/refrigeration, etc.) of one or more available promotional display spaces is not sufficient for the needs of items of the first subcategory. It may be appreciated that a display optimization filter may be based upon one or more constraints.

The controller 105 utilizes the sales records analyzer 140 to analyze the sales records 135 for the items that belong to the candidate subcategory to calculate an item profit contribution score for each of the items assigned to the candidate subcategory. For example, a first item profit contribution score is calculated for a first item (apples) from the candidate subcategory (fruit) based upon an increase in sales of the first item corresponding to the placement of the first item in promotional display spaces, a second item profit contribution score is calculated for a second item (oranges) from the candidate subcategory (fruit) based upon an increase in sales of the second item corresponding to the placement of the second item in promotional display spaces, etc.

The controller 105 utilizes the sales records analyzer 140 to select an item to be placed on promotional display space from the items assigned to the candidate subcategory. For example, in response to determining that the first item profit contribution score of the first item (apples) is greater (or, in some embodiments, lower) than other item profit contribution scores calculated for other items (oranges, peaches, etc.) assigned to the candidate subcategory, the first item is selected to be placed on a promotional display space. In some examples, an item profit contribution score for an item is calculated by predicting sales for the item in the absence of promotions and price reductions, calculating a lift (increase in sales) for the item based upon the predicted sales, and calculating the increase in profit of the item based upon the lift.

The controller 105 generates schedule instructions 145 including a schedule data structure to provide to, and thus control, the promotional display implementer 150. The schedule data structure may assign the selected item to the promotional display space. The schedule instructions 145 may thus provide for the promotional display implementer 150 to cause the selected item to be placed on the promotional display space. For example, the schedule instructions 145 may provide for the promotional display implementer 150 to cause the first item to be placed on the promotional display space, but may not provide for the promotional display implementer 150 to cause the second item to be placed on the promotional display space.

In some examples, the controller 105 may generate schedule instructions for a different store (branch) of the same retailer using similar techniques but based upon sales records specific to the different store rather than the sales records 135 corresponding to the store. Thus, the schedule instructions for the different store may assign different items to promotional display spaces than the schedule instructions 145 for the store (even though the store and the different store may be branches of a same retailer).

In one embodiment, the system 100 is a computing/data processing system including an application or collection of distributed applications for enterprise organizations. The applications and system 100 may be configured to operate with or be implemented as a cloud-based networking system, a software as a service (SaaS) architecture, or other type of networked computing solution. In one embodiment the system 100 is a centralized server-side application that provides at least the functions disclosed herein and that is accessed by many users via computing devices/terminals communicating with the system 100 (functioning as the server) over a computer network.

Figure 2:
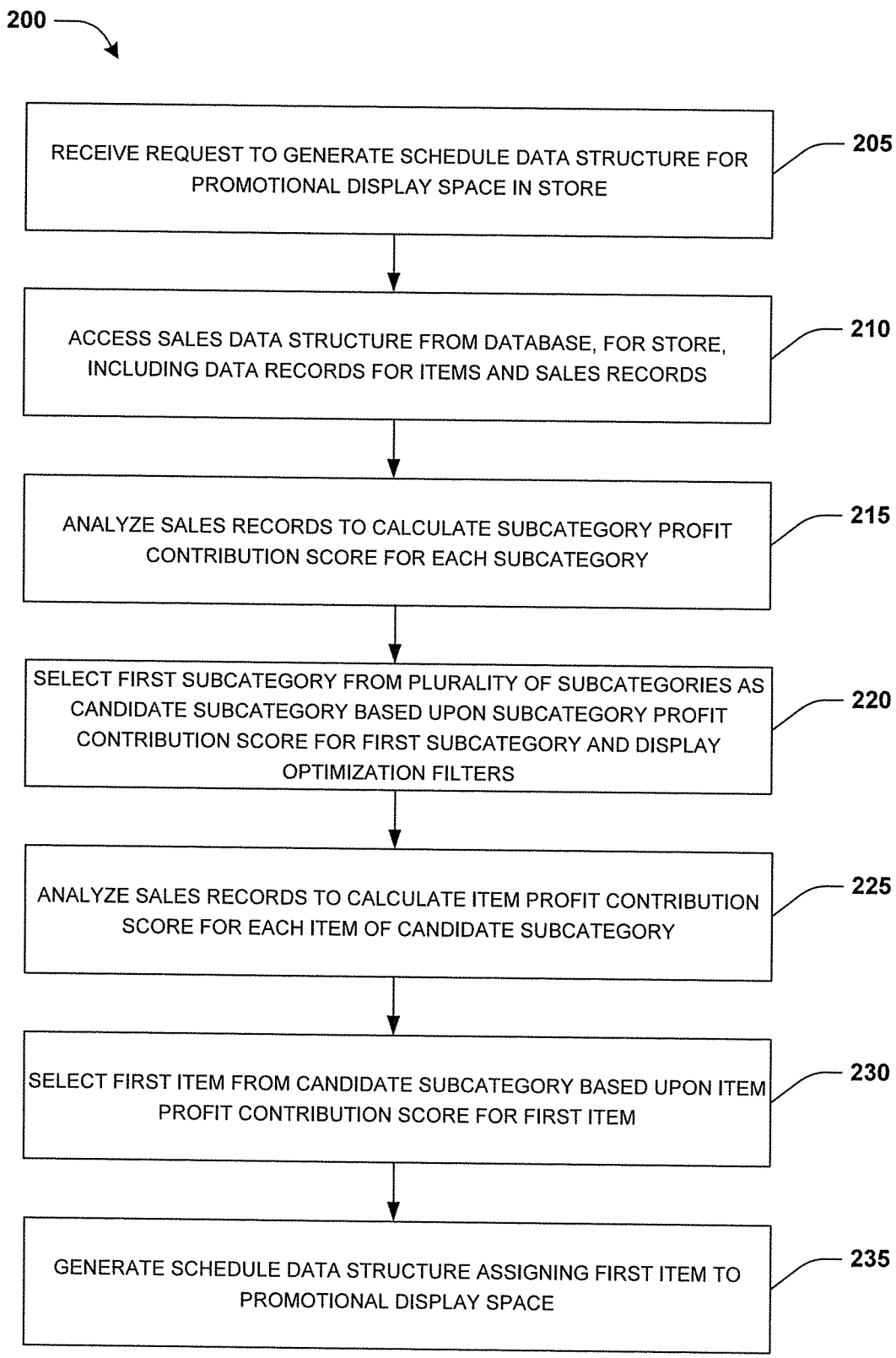
FIG. 2 illustrates an embodiment of a method associated with assigning the item from the plurality of items to the promotional display space.

FIG. 2 illustrates one embodiment of a computer-implemented method 200 associated with generating a schedule data structure for an item to be placed on a promotional display space in a store using a hierarchical estimation and optimization process. In one embodiment, method 200 is performed by the controller 105 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the schedule request 110 from the entity computer 115, etc.

Figure 4:
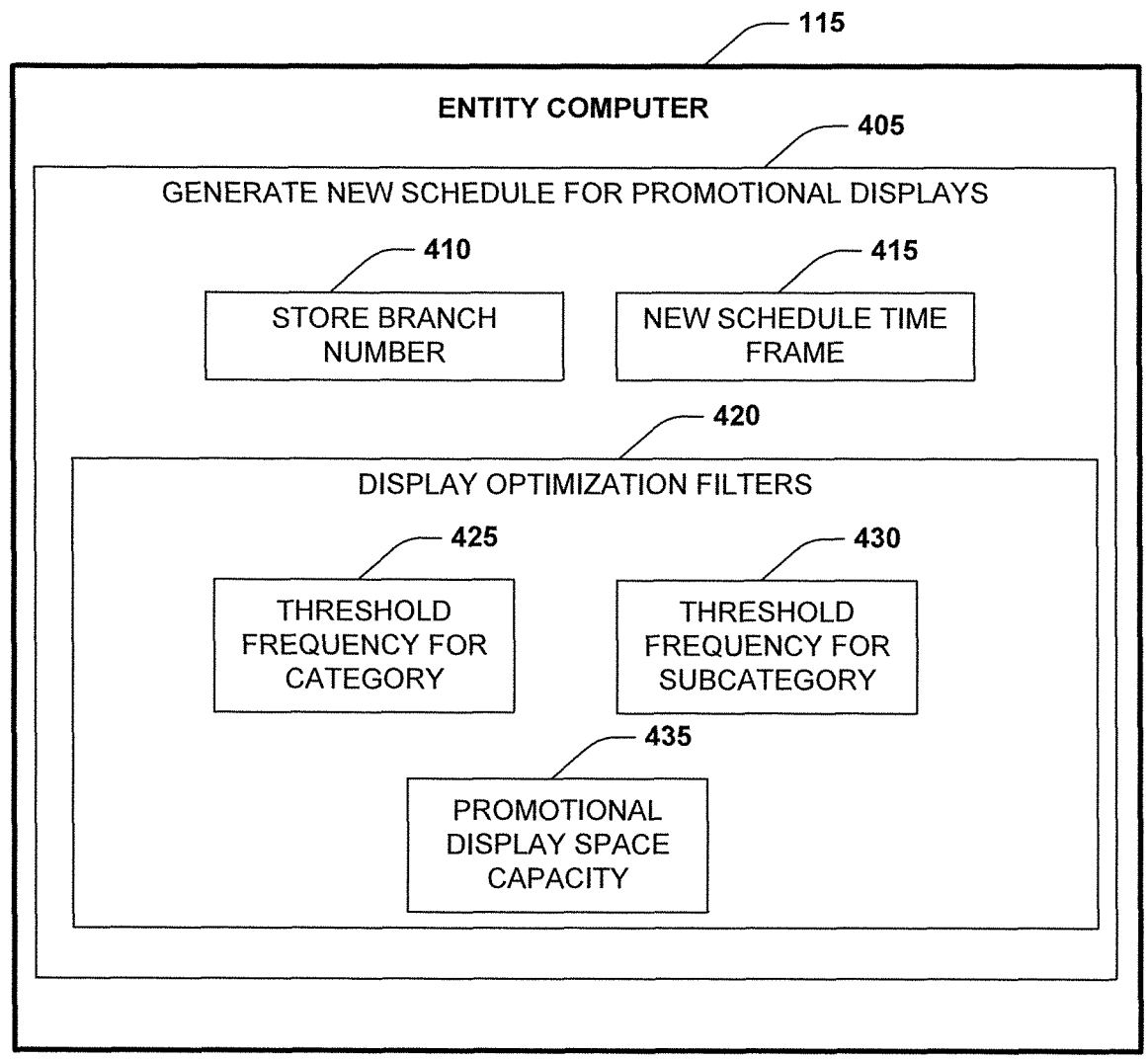
FIG. 4 illustrates an embodiment of an entity computer and a graphical user interface.

At 205, the schedule request 110 to generate a schedule data structure for a promotional display space in a store is received. In some examples, the schedule request 110 is received by a server (hosting the controller 105), from the entity computer 115. FIG. 4 illustrates one embodiment of a graphical user interface 405 on the entity computer 115 that may be used to generate the schedule request 110. The graphical user interface 405 is controlled to display a first graphical object 410 configured to receive user input that selects an identifier (branch number) of the store, a second graphical object 415 configured to receive user input that selects a time frame (1 month, 1 season, 1 year, etc.) that the schedule is to encompass, and a third graphical object 420 configured to receive user input that selects display optimization filters to be used when selecting items for the schedule.

The third graphical object 420 includes a fourth graphical object 425 configured to receive user input that selects a threshold frequency for assigning items of a product category to one or more promotional display spaces, a fifth graphical object 430 configured to receive user input that selects a threshold frequency for assigning items of a subcategory to one or more promotional display spaces, and a sixth graphical object 435 configured to receive user input defining a capacity of promotional display spaces (available) in the store. In some examples, the capacity is automatically determined/estimated based upon records accessed in the sales data structure 130, based upon a size of the store, or based upon an analysis of pictures of the interior of the store. In some examples, the schedule request 110 does not specify a product category for placement in promotional display spaces; instead, a plurality of product categories are (automatically) considered, and items from two or more product categories may be assigned to promotional display spaces in the store.

At 210, in response to receiving the schedule request 110 to generate the schedule data structure for the promotional display space in the store, the sales data structure 130 is accessed from a database via a network communication. One embodiment of the sales data structure 130 is illustrated in FIG. 3 and includes indications of a plurality of items 305 and a plurality of product categories 310, subcategories 315, sales 320 and times in promotional display spaces 325 associated with one or more of the plurality of items 305. Sales records 135 in the sales data structure 130 that correspond to the criteria 125 may be accessed (downloaded), while other sales records that do not correspond to the criteria 125 may not be accessed.

At 215, the sales records 135 are analyzed to calculate a subcategory profit contribution score for each of the plurality of subcategories relative to other subcategories. For example, a first subcategory profit contribution score is determined for a first subcategory (cola soft drinks), a second subcategory profit contribution score is determined for a second subcategory (ginger ale soft drinks), a third subcategory profit contribution score is determined for a third subcategory (craft beers), and a fourth subcategory profit contribution score is determined for a fourth subcategory (premium beers).

Each subcategory profit contribution score represents an increase in sales of items of the corresponding subcategory measured or estimated to be caused by placement of the items in promotional display spaces. For example, a subcategory profit contribution score of a subcategory may be based upon a difference between average sales (profits) of items of the subcategory while items of the subcategory are placed on promotional display spaces and average sales (profits) of items of the subcategory while items of the subcategory are not placed on promotional display spaces. In another example, where sufficient data is not available/accessible for a subcategory, a subcategory profit contribution score of the subcategory may be based upon a difference between average sales (profits) of items of a similar subcategory while items of the similar subcategory are placed on promotional display spaces and average sales (profits) of items of the similar subcategory while items of the similar subcategory are not placed on promotional display spaces.

At 220, the first subcategory is selected from the plurality of subcategories as a candidate subcategory of items to be placed on the promotional display space. The selection of the first subcategory (cola soft drinks) is based upon a determination that the first subcategory profit contribution score is greater (or, in some embodiments, lower) than other subcategory profit contribution scores for other subcategories (ginger ale soft drinks, craft beer, etc.). For example, the subcategory profit contribution scores for the plurality of subcategories may be compared, and the subcategory with the greatest (or, in some embodiments, lowest) subcategory profit contribution score is selected.

The selection of the first subcategory (cola soft drinks) is also based upon a determination that the first subcategory is not disqualified from placement on a promotional display surface by one or more display optimization filters. For example, a determination may be made that items of the first subcategory (cola soft drinks) were not placed on the promotional display surface more than a threshold amount of time (1 day, 1 week, etc.) during a past month, that items of the product category (soft drinks) of the first subcategory (cola soft drinks) were not placed on the promotional display space more than a second threshold amount of time (2 days, 2 week, etc.) during a past month, and that there is promotional display space in the store available and capable of carrying items of the first subcategory.

At 225, the sales records 135 for items belonging to the candidate subcategory are analyzed to calculate an item profit contribution score for each of the items assigned to the candidate subcategory. For example, a first item profit contribution score is determined for a first item (Famous Cola) of the candidate subcategory (cola soft drinks), and a second item profit contribution score is determined for a second item (Generic Cola) of the candidate subcategory. Each item profit contribution score represents an increase in sales of an item measured or estimated to be caused by placement of the item in promotional display spaces. For example, an item profit contribution score of an item may be based upon a difference between average sales (profits) of the item while the item is placed on promotional display spaces and average sales (profits) of items of the item while the item is not placed on promotional display spaces.

At 230, the first item is selected from the items belonging to the candidate subcategory to be placed on the promotional display space. The selection of the first item (Famous Cola) is based upon a determination that the first item profit contribution score is greater (or, in some embodiments, lower) than other subcategory profit contribution scores for other items (Generic Cola, Cherry Cola, etc.) belonging to the candidate subcategory. For example, the subcategory profit contribution scores for the plurality of subcategories may be compared, and the subcategory with the greatest (or, in some embodiments, lowest) subcategory profit contribution score is selected.

In some examples, the selection of the first item (Famous Cola) is also based upon a determination that the first item is not disqualified from placement on a promotional display surface by one or more item-specific display optimization filters. For example, a determination may be made that the first item was not placed on the promotional display surface more than a threshold amount of time (1 day, 1 week, etc.) during a past month, and that there is promotional display space in the store available and capable of carrying the first item.

At 235, the schedule data structure, including a representation of the schedule, is generated, and assigns the first item (Famous Cola) to the promotional display space. The assignment of the first item to the promotional display space in the schedule data structure causes the first item to be placed on the promotional display space. In some examples, the schedule data structure is included in the schedule instructions 145, which are provided to the promotional display implementer 150.

The promotional display implementer 150 uses the schedule data structure to cause the first item to be placed on the promotional display space, cause one or more other items to be placed on the promotional display space, and cause one or more other items to be removed from the promotional display space. In some examples, the promotional display implementer 150 may provide physical/print instructions to an operator at the store, while in other examples, the promotional display implementer 150 may provide digital instructions to one or more machines configured to physically retrieve items from a storage location, transport the items to the promotional display space, and/or place the items on the promotional display space in accordance with the schedule instructions 145.

Figure 5:
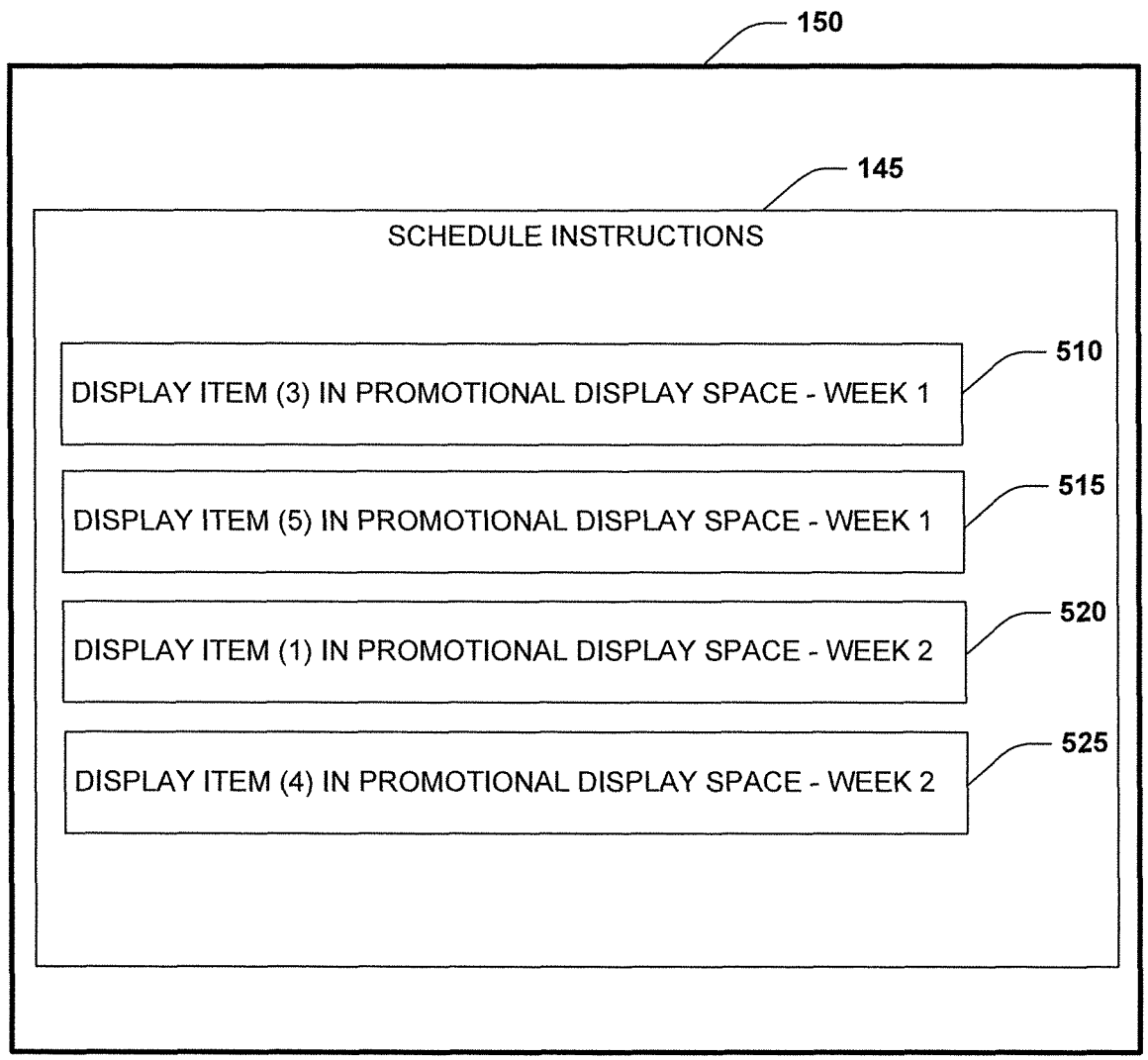
FIG. 5 illustrates an embodiment of a promotional display implementer with schedule instructions.

One embodiment of the schedule instructions 145 is shown in FIG. 5, as a data structure received by the promotional display implementer 150. The schedule instructions 145 include a first instruction 510 to display a third item in a promotional display space for a first period of time from a first start time to a first end time (during a first week), a second instruction 515 to display a fifth item in a promotional display space for the first period of time from the first start time to the first end time (during the first week), a third instruction 520 to display the first item in a promotional display space for a second period of time from a second start time to a second end time (during a second week), and a fourth instruction 525 to display a fourth item in a promotional display space for the second period of time from the second start time to the second end time (during the second week).

Figure 6:
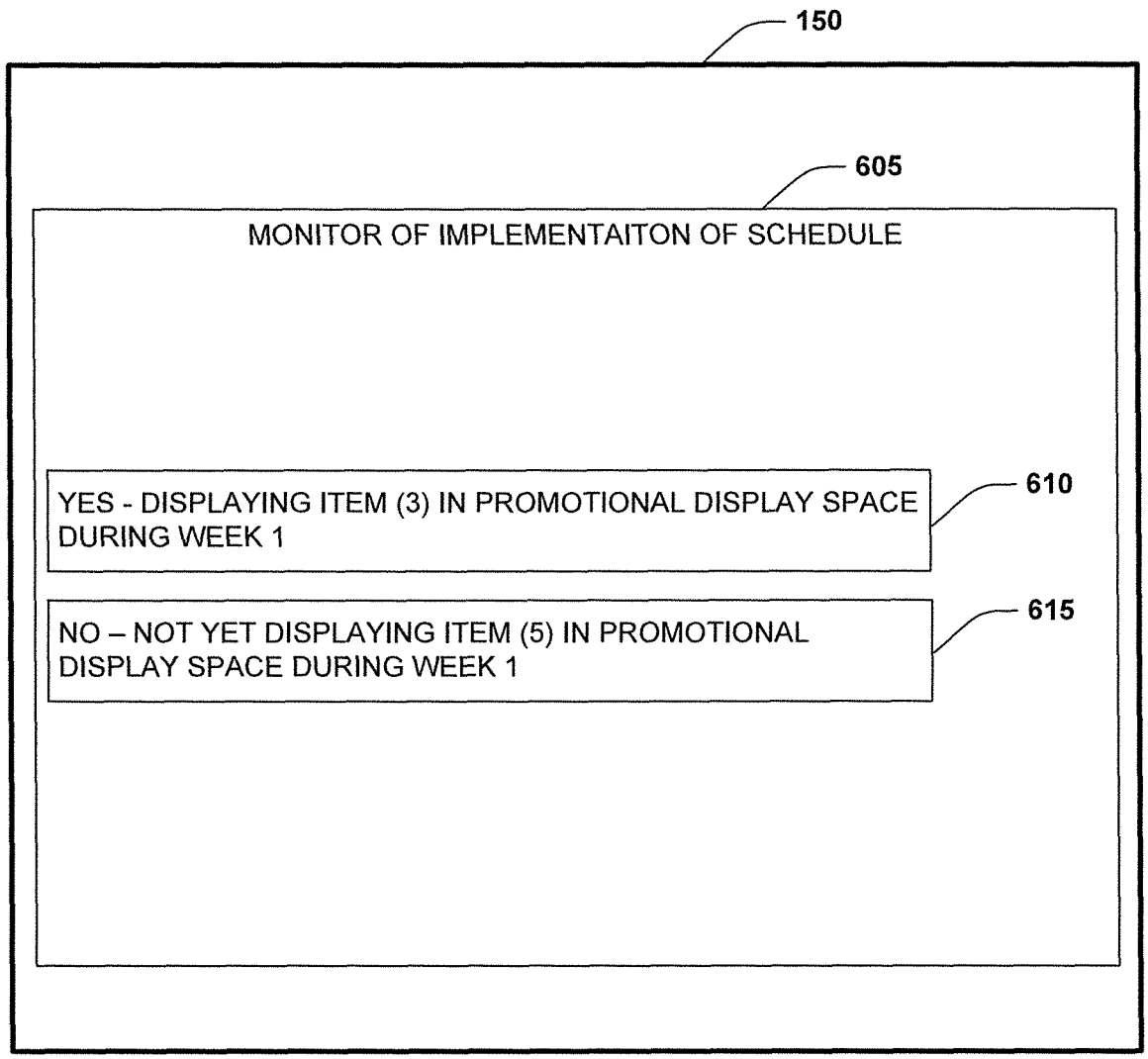
FIG. 6 illustrates an embodiment of the promotional display implementer with a monitor interface.

It may be appreciated that in some examples, the promotional display implementer 150 monitors the status of one or more promotional display spaces in the store, and the implementation of the schedule, as illustrated in FIG. 6. The promotional display implementer 150 includes a monitor interface 605, which displays a first indicator 610 displaying a status of the third item during the first week, and a second indicator 615 displaying a status of the fifth item. For example, the first indicator may indicate that the third item is being displayed in a promotional display space in accordance with the schedule instructions 145, while the second indicator may indicate that the fifth item is not yet being displayed in a promotional display space, and is thus not in accordance with the schedule instructions 145. In some examples, the monitor interface 605 is generated based upon user feedback indicative of an impression of a user at the store, while in other examples, the monitor interface 605 is generated based upon image analysis of images/videos (a live feed) of the interior of the store.

It may be appreciated that use of the hierarchical estimation and optimization process may allow for obtaining estimations using a large number of items sold at a store, rather than limiting estimation to a small portion of items sold at the store.

In some examples, one or more acts of method 200 may be performed while accounting for halo effects (positive or negative) that placing an item in a promotional display space has on other items in a same subcategory and/or product category as the item. The halo effects may be calculated based upon sales records corresponding to the item and the other items. For example, a halo effect that placing Famous Cola in a promotional display space has on Generic Cola (or Famous Ginger Ale) may be calculated based upon an increase in sales of Generic Cola (or Famous Ginger Ale) measured or estimated to be caused by placement of Famous Cola in promotional display spaces.

In one embodiment, one or more of the acts of method 200 are performed using decision variables in a linear program. The decision variables are defined as x(subcategory, week, duration), meaning for each combination of subcategory-week-duration, there is one decision variable. These decision variables are binary, so they may take on the value 0 or the value 1. When $x(s, w, d)=1$, this means that subcategory s starts being on display in week w, and is on display for duration d consecutive weeks. The duration is limited to the values 1, 2, and 3, because it is very unlikely a retailer will want to display the same subcategory for more than 3 weeks in a row. For example, if there are 100 possible subcategories, 13 weeks, and 3 durations, then there is a total of $100 \times 13 \times 3 = 3,900$ decision variables. The decision variables represent the fundamental choices that the optimizer must make, namely which subcategories to put on display in which weeks, and for how long.

Each $x(s, w, d)$ is associated with a number that represents the subcategory profit contribution score resulting from placing s on display in week w for a duration of 1 week. For the other durations, the retailer may simply double or triple the incremental display profit (for duration=2 or 3, respectively). However, often the retailer may put values less than these, to represent the decrease in incremental display lift that will occur once the same subcategory is on display for consecutive weeks. It is up to the retailer's discretion for how much decrease to use (this is known as promotional decay, meaning less promotional response to the same promotion if it is run for consecutive weeks). With decaying subcategory profit contribution scores, a choice is made between keeping the same subcategory on display but at a decaying incremental profit vs. switching to displaying a different subcategory altogether.

This approach to decision variables allows the retailer to incorporate additional adjustments if necessary. For example, if due to a vendor-funds deal, a particular subcategory will produce more incremental profit in certain weeks, the retailer can adjust the relevant incremental display profits to reflect the same.

In one embodiment, one or more of the acts of method 200 are performed using an objective function that is the sum of one or more of the above decision variables, each multiplied by a coefficient representing the incremental profit associated with the decision variable. Thus, the objective function represents the total incremental display profit obtained from all decision variables.

In one embodiment, for a particular week w and subcategory s, 6 of the decision variables overlap on week w: x(s, w, 1), x(s, w, 2), x(s, w, 3), x(s, w−1, 2), x(s, w−1, 3), and x(s, w−2, 3), meaning if any of these have the value 1, then s is on display during week w. For each combination of s and w, no more than one of these should be set to 1.

It may be convenient to have another set of variables y(s, w), for each subcategory s and week w, which is representative of "s is on display during week w", where y(s, w) equals the sum of the 6 decision variables that overlap on week w. Then y(s, w) is either 1 or 0 in accordance with whether s is on display during week w.

In one embodiment, a retailer will have business rules that restrict how soon a subcategory can be on display again after it is on display. For example, where x(s, w, 1)=1, and the retailer does not want s to be on display again for at least 2 weeks, filters based on the following constraints may be used: (i) y(s, w+1) less than or equal to 1−x(s, w, 1), and (ii) y(s, w+2) less than or equal to 1−x(s, w, 1). Thus, y(s, w+1) and y(s, w+2) are 0 if x(s, w, 1)=1, thus preventing s from being on display again for the next two weeks after w. Similar techniques may be used to filter subcategories and/or items based upon the capacity/number of promotional display spaces available in the store, the number of weeks that a subcategory can be on display, etc.

In one embodiment, a retailer may not want to fill all of the displays from the same category, even if that would yield the highest incremental profit. For example, a grocer may not want to fill all of the displays with beer simultaneously, so the grocer may use filters based on the following constraints: for each category C and each week w, the sum of all y(s, w) where s is a subcategory of C is less than displays(C, w), where displays(C, w) is the maximum number of displays that should be devoted to category C in week w.

In one embodiment, a retailer may want to implement filters at the category level (rather than the subcategory level). For example, the retailer may request that two categories A and B are either simultaneously on display or neither is on display, and may thus use filters based on the following constraints: (i) (1/M)×(the sum of y(s, w) for subcategories s of A)=<the sum of y(s, w) for subcategories s of B, and (ii) M×(the sum of y(s, w) for subcategories s of A)>=the sum of y(s, w) for subcategories s of B. M may be a number (e.g., 1,000) larger than the total number of subcategories assigned to one or more (e.g., any) category of product carried by the retailer.

In one embodiment, a retailer may factor in a changeover cost, which is the cost of changing the items assigned to promotional display spaces when scheduling items for the promotional display spaces. For example, a determination may be made to keep existing items of a subcategory in promotional display spaces to avoid incurring the cost of assigning items of a different subcategory to the promotional display spaces. Alternatively, items of the different subcategory may be assigned to the promotional display spaces upon determining that an increase in profit for the items of the different subcategory exceeds the cost of changing to the different subcategory.

Figure 7:
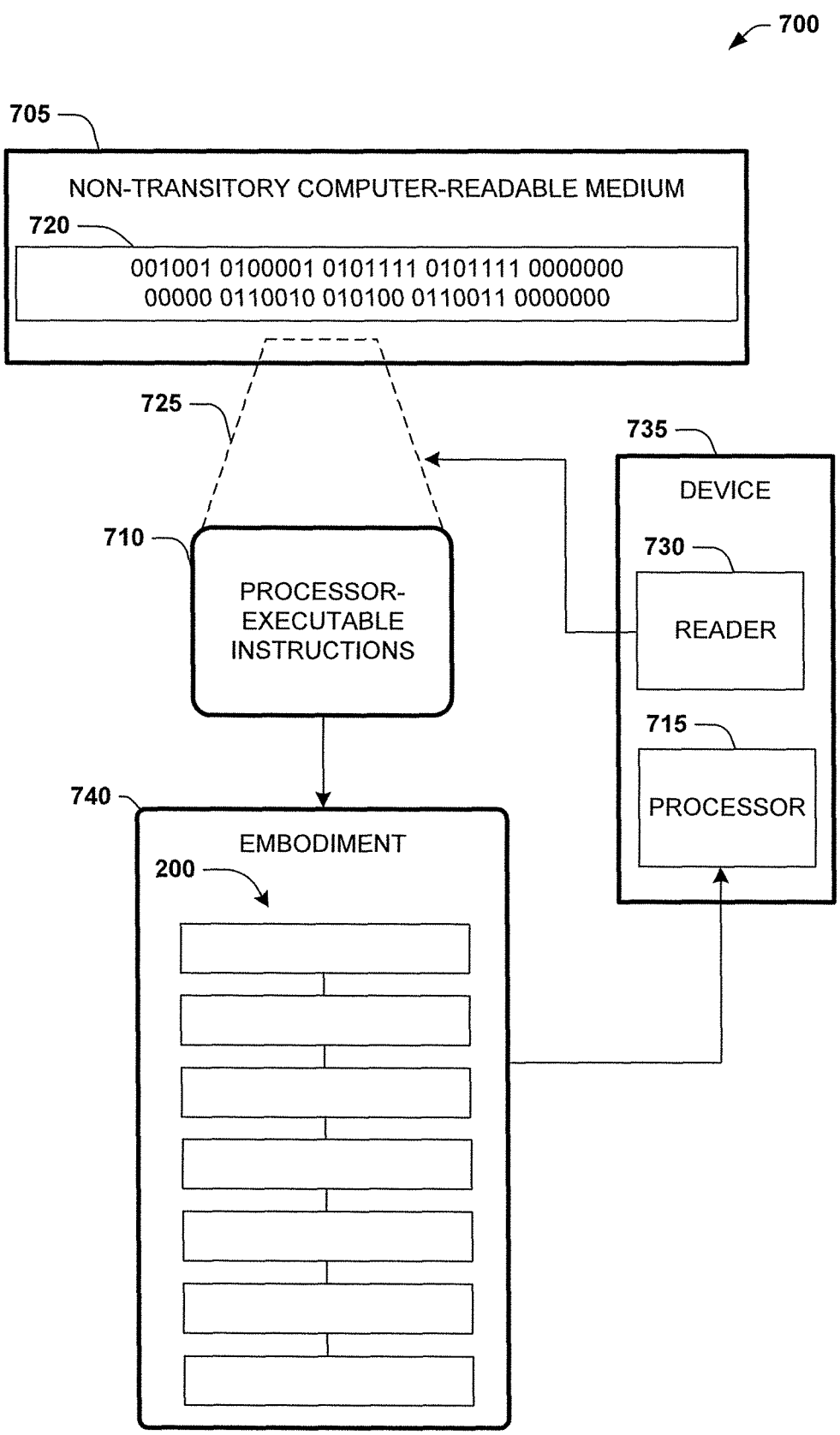
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
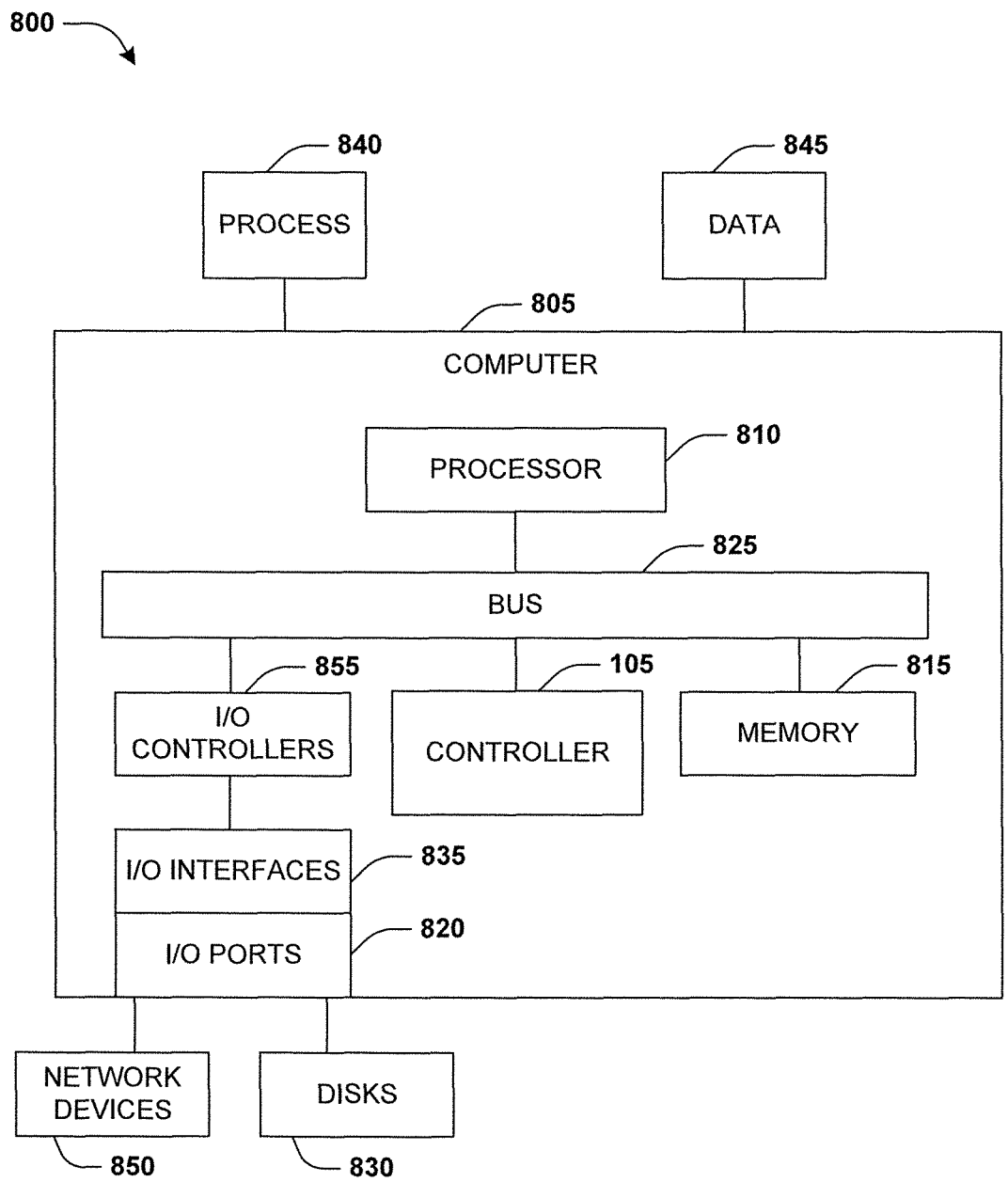
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multiprocessor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer cause the computer to:
in response to receiving a request to generate a schedule data structure for a promotional display space in a particular store for a particular time frame and based upon a plurality of display optimization filters, for the particular store:
access a sales data structure from a database via a network communication, wherein the sales data structure corresponds to the particular store identified in the request and includes data records for:
(i) a plurality of items that are sold by the particular store,
(ii) sales records for each of the plurality of items over a period of time, wherein each of the plurality of items is assigned to one of a plurality of subcategories that belong to one of a plurality of product categories,
(iii) an average price paid for the item at the particular store during the period of time,
(iv) promotional instruments applicable to the item used during the time period, wherein the promotional instruments include coupons, flyers, and advertisements,
(v) data that identifies the particular store,
(vi) information about a store capacity of the particular store which includes a number of currently available promotional display spaces in the particular store, and
(vii) a record of dates of placement of each of the plurality of items in the promotional display spaces;
analyze the data records for the items associated with each of the plurality of subcategories to calculate a subcategory profit contribution score for each of the plurality of subcategories relative to other subcategories;
select a first subcategory from the plurality of subcategories as a candidate subcategory of items to be placed on the promotional display space of the particular store based upon:
(i) the subcategory profit contribution score of the first subcategory being greater than other subcategory profit contribution scores, and
(ii) the plurality of display optimization filters which correspond to:
(i) a promotional display history of a first product category at the particular store to which the first subcategory belongs,
(ii) a promotional display history of the first subcategory at the particular store, and
(iii) the store capacity of the particular store which is based upon the information about the store capacity of the particular store and which includes the number of currently available promotional display spaces in the particular store;
analyze the data records from the sales data structure for the items that belong to the candidate subcategory based upon the subcategory profit contribution score and the display optimization filters to calculate an item profit contribution score for each of the items assigned to the candidate subcategory;
select a first item from the candidate subcategory to be placed on the promotional display space of the particular store, based upon the item profit contribution score of the first item being greater than other item profit contribution scores from the candidate subcategory;
generate, by the processor, the schedule data structure assigning the first item to the promotional display space of the particular store;
transmit the schedule data structure to one or more machines associated with the particular store, wherein the one or more machines are configured to physically retrieve items from a storage location;
transport the first item to the promotional display space by the one or more machines; and
place the first item on the promotional display space of the particular store by the one or more machines, in accordance with the schedule data structure received from the processor.

2. The non-transitory computer-readable medium of claim 1, wherein the display optimization filters comprise:
(i) a first display optimization filter defining a threshold frequency for assigning items of a product category to one or more of the promotional display spaces;
(ii) a second display optimization filter defining a threshold frequency for assigning items of a subcategory to one or more of the promotional display spaces; and
(iii) a third display optimization filter defining the store capacity of the promotional display spaces in the particular store.

3. The non-transitory computer-readable medium of claim 1,
wherein the computer-executable instructions to analyze the data records for the items associated with each of the plurality of subcategories to calculate the subcategory profit contribution score for each of the plurality of subcategories relative to other subcategories further include computer-executable instructions that when executed by the processor cause the computer to:
calculate a first raw subcategory score for the first subcategory;
calculate a second raw subcategory score for a second subcategory belonging to the first product category;
select the second raw subcategory score as a reference point for the first product category;
calculate a first relative subcategory score for the first subcategory based upon a comparison of the first raw subcategory score and the second raw subcategory score; and
calculate the subcategory profit contribution score for the first subcategory based upon a comparison of the first relative subcategory score to a third relative subcategory score for a third subcategory belonging to a second product category.

4. The non-transitory computer-readable medium of claim 1, wherein the sales data structure further includes data records for:
the first item is assigned to the first subcategory;
the first subcategory belongs to the first product category;
a second item is assigned to a second subcategory; and
the second subcategory belongs to a second product category.

5. The non-transitory computer-readable medium of claim 4, wherein the computer-executable instructions to generate the schedule data structure further include computer-executable instructions that when executed by the processor cause the computer to:
assign the first item to the promotional display space and the second item to a second promotional display space in the store for a first period of time from a first start time to a first end time; and
assign a third item to the promotional display space and a fourth item to the second promotional display space for a second period of time from a second start time to a second end time.

6. The non-transitory computer-readable medium of claim 1, wherein the computer-executable instructions to analyze the data records for the items associated with each of the plurality of subcategories to calculate the subcategory profit contribution score for each of the plurality of subcategories relative to other subcategories further include computer-executable instructions that when executed by the processor cause the computer to:
identify first sales records, for a third item assigned to the first subcategory, corresponding to one or more periods of time when the third item was assigned to a promotional display space;
identify second sales records, for the third item, corresponding to one or more periods of time when the third item was assigned to a non-promotional display space and was not assigned to a promotional display space; and
calculate the subcategory profit contribution score based upon a comparison of the first sales records and the second sales records.

7. The non-transitory computer-readable medium of claim 1, wherein the computer-executable instructions to analyze the data records from the sales data structure for the items that belong to the candidate subcategory to calculate the item profit contribution score for each of the items assigned to the candidate subcategory further include computer-executable instructions that when executed by the processor cause the computer to:
identify first sales records, for the first item, corresponding to one or more periods of time when the first item was assigned to a promotional display space;
identify second sales records, for the first item, corresponding to one or more periods of time when the first item was assigned to a non-promotional display space and was not assigned to the promotional display space; and
calculate the item profit contribution score for the first item based upon a comparison of the first sales records and the second sales records.

8. A computing system, comprising:
a processor connected to memory; and
a scheduling module stored on a non-transitory computer readable medium and configured with instructions that when executed by the processor cause the processor to:
in response to receiving a request to generate a schedule data structure for a promotional display space in a particular store for a particular time frame and based upon a plurality of display optimization filters, for the particular store:
access a sales data structure from a database via a network communication, wherein the sales data structure corresponds to the particular store identified in the request and includes data records for:
(i) a plurality of items that are sold by the particular store,
(ii) sales records for each of the plurality of items over a period of time, wherein each of the plurality of items is assigned to one of a plurality of subcategories that belong to one of a plurality of product categories,
(iii) an average price paid for the item at the particular store during the period of time,
(iv) promotional instruments applicable to the item used during the time period, wherein the promotional instruments include coupons, flyers, and advertisements,
(v) data that identifies the particular store,
(vi) information about a store capacity of the particular store, and (vii) a record of dates of placement of each of the plurality of items in the promotional display spaces;

analyze the data records for the items associated with each of the plurality of subcategories to calculate a subcategory profit contribution score for each of the plurality of subcategories relative to other subcategories;

select a first subcategory from the plurality of subcategories as a candidate subcategory of items to be placed on the promotional display space of the particular store based upon:
  (i) the subcategory profit contribution score of the first subcategory being greater than other subcategory profit contribution scores, and
  (ii) the plurality of display optimization filters which are configured by:
    (i) a promotional display history of a first product category at the particular store to which the first subcategory belongs,
    (ii) a promotional display history of the first subcategory at the particular store, and
    (iii) the store capacity of the particular store which is based upon the information about the store capacity of the particular store and which includes the number of currently available promotional display spaces in the particular store;

analyze the data records from the sales data structure for the items that belong to the candidate subcategory based upon the subcategory profit contribution score and the display optimization filters to calculate an item profit contribution score for each of the items assigned to the candidate subcategory;

select a first item from the candidate subcategory to be placed on the promotional display space of the particular store, based upon the item profit contribution score of the first item being greater than other item profit contribution scores from the candidate subcategory;

generate the schedule data structure assigning the first item to the promotional display space of the particular store;

transmit the schedule data structure to one or more machines associated with the particular store, wherein the one or machines are configured to physically retrieve items from a storage location;

transport the first item to the promotional display space by the one or more machines; and place the first item on the promotional display space of the particular store by the one or more machines, in accordance with the schedule data structure received from the processor.

9. The computing system of claim 8, wherein the display optimization filters comprise:
(i) a first display optimization filter defining a threshold frequency for assigning items of a product category to one or more of the promotional display spaces;
(ii) a second display optimization filter defining a threshold frequency for assigning items of a subcategory to one or more of the promotional display spaces; and
(iii) a third display optimization filter defining the store capacity of promotional display spaces in the store.

10. The computing system of claim 8, wherein the instructions to analyze the data records for the items associated with each of the plurality of subcategories to calculate the subcategory profit contribution score for each of the plurality of subcategories relative to other subcategories further include instructions that when executed by the processor cause the processor to:
calculate a first raw subcategory score for the first subcategory;
calculate a second raw subcategory score for a second subcategory belonging to the first product category;
select the second raw subcategory score as a reference point for the first product category;
calculate a first relative subcategory score for the first subcategory based upon a comparison of the first raw subcategory score and the second raw subcategory score; and
calculate the subcategory profit contribution score for the first subcategory based upon a comparison of the first relative subcategory score to a third relative subcategory score for a third subcategory belonging to a second product category.

11. The computing system of claim 8, wherein the sales data structure further includes data records for:
the first item is assigned to the first subcategory;
the first subcategory belongs to the first product category;
the second item is assigned to a second subcategory; and
the second subcategory belongs to a second product category.

12. The computing system of claim 8, wherein the instructions to generate the schedule data structure further include instructions that when executed by the processor cause the processor to:
assign the first item to the promotional display space and the second item to a second promotional display space in the store for a first period of time from a first start time to a first end time; and
assign a third item to the promotional display space and a fourth item to the second promotional display space for a second period of time from a second start time to a second end time.

13. The computing system of claim 8, wherein the instructions to analyze the data records for the items associated with each of the plurality of subcategories to calculate the subcategory profit contribution score for each of the plurality of subcategories relative to other subcategories further include instructions that when executed by the processor cause the processor to:
identify first sales records, for a third item assigned to the first subcategory, corresponding to one or more periods of time when the third item was assigned to a promotional display space;
identify second sales records, for the third item, corresponding to one or more periods of time when the third item was assigned to a non-promotional display space and was not assigned to a promotional display space; and
calculate the subcategory profit contribution score based upon a comparison of the first sales records and the second sales records.

14. The computing system of claim 8, wherein the instructions to analyze the data records from the sales data structure for the items that belong to the candidate subcategory to calculate the item profit contribution score for each of the items assigned to the candidate subcategory further include instructions that when executed by the processor cause the processor to:
identify first sales records, for the first item, corresponding to one or more periods of time when the first item was assigned to a promotional display space;
identify second sales records, for the first item, corresponding to one or more periods of time when the first item was assigned to a non-promotional display space and was not assigned to the promotional display space; and calculate the item profit contribution score for the first item based upon a comparison of the first sales records and the second sales records.

15. A computer-implemented method performed by a computing device comprising a processor, the computer-implemented method comprising:

in response to receiving a request to generate a schedule data structure for a promotional display space in a particular store for a particular time frame and based upon a plurality of display optimization filters, for the particular store:

accessing, by at least the processor, a sales data structure from a database via a network communication, wherein the sales data structure corresponds to the particular store identified in the request and includes data records for:
(i) a plurality of items that are sold by the particular store,
(ii) sales records for each of the plurality of items over a period of time, wherein each of the plurality of items is assigned to one of a plurality of subcategories that belong to one of a plurality of product categories,
(iii) an average price paid for the item at the particular store during the period of time,
(iv) promotional instruments applicable to the item used during the time period, wherein the promotional instruments include coupons, flyers, and advertisements,
(v) data that identifies the particular store,
(vi) information about a store capacity of the particular store which includes a number of currently available promotional display spaces in the particular store, and
(vii) a record of dates of placement of each of the plurality of items in the promotional display spaces;

analyzing, by at let the processor, the data records for the items associated with each of the plurality of subcategories to calculate a subcategory profit contribution score for each of the plurality of subcategories;

selecting, by at least the processor, a first subcategory from the plurality of subcategories as a candidate subcategory of items to be placed on the promotional display space of the particular store based upon:
(i) the subcategory profit contribution score of the first subcategory being greater than other subcategory profit contribution scores, and
(ii) the plurality of display optimization filters which are defined by:
(i) a promotional display history of a first product category at the particular store to which the first subcategory belongs,
(ii) a promotional display history of the first subcategory at the particular store, and
(iii) the store capacity of the particular store which is based upon the information about the store capacity of the particular store and which includes the number of currently available promotional display spaces in the particular store;

analyzing, by at least the processor, the data records from the sales data structure for the items that belong to the candidate subcategory based upon the subcategory profit contribution score and the display optimization filters to calculate an item profit contribution score for each of the items assigned to the candidate subcategory;

selecting, by at least the processor, a first item from the candidate subcategory to be placed on the promotional display space of the particular store, based upon the item profit contribution score of the first item being greater than other item profit contribution scores from the candidate subcategory;

generating, by the processor, the schedule data structure assigning the first item to the promotional display space of the particular store;

transmitting the schedule data structure to one or more machines associated with the particular store, wherein the one or more machines are configured to physically retrieve items from a storage location;

transporting the first item to the promotional display space by the one or more machines; and placing the first item on the promotional display space of the particular store by the one or more machines, in accordance with the schedule data structure received from the processor.

16. The computer-implemented method of claim 15, wherein the analyzing the data records for the items associated with each of the plurality of subcategories to calculate the subcategory profit contribution score for each of the plurality of subcategories relative to other subcategories further comprises:

calculating a first raw subcategory score for the first subcategory;

calculating a second raw subcategory score for a second subcategory belonging to the first product category;

selecting the second raw subcategory score as a reference point for the first product category;

calculating a first relative subcategory score for the first subcategory based upon a comparison of the first raw subcategory score and the second raw subcategory score; and calculating the subcategory profit contribution score for the first subcategory based upon a comparison of the first relative subcategory score to a third relative subcategory score for a third subcategory belonging to a second product category.

17. The computer-implemented method of claim 15, wherein the sales data structure further includes data records for:

the first item is assigned to the first subcategory; and
the first subcategory belongs to the first product category.

18. The computer-implemented method of claim 15, wherein the generating the schedule data structure further comprises:

assigning the first item to the promotional display space for a first period of time from a first start time to a first end time; and assigning a third item to the promotional display space for a second period of time from a second start time to a second end time.

19. The computer-implemented method of claim 15, wherein the analyzing the data records for the items associated with each of the plurality of subcategories to calculate the subcategory profit contribution score for each of the plurality of subcategories relative to other subcategories further comprises:

identifying first sales records, for a third item assigned to the first subcategory, corresponding to one or more periods of time when the third item was assigned to a promotional display space;

identifying second sales records, for the third item, corresponding to one or more periods of time when the third item was assigned to a non-promotional display space and was not assigned to a promotional display space; and calculating the subcategory profit contribution score based upon a comparison of the first sales records and the second sales records.

20. The computer-implemented method of claim 15, wherein the analyzing the data records from the sales data structure for the items that belong to the candidate subcategory to calculate the item profit contribution score for each of the items assigned to the candidate subcategory further comprises:

identifying first sales records, for the first item, corresponding to one or more periods of time when the first item was assigned to a promotional display space;

identifying second sales records, for the first item, corresponding to one or more periods of time when the first item was assigned to a non-promotional display space and was not assigned to the promotional display space; and calculating the item profit contribution score for the first item based upon a comparison of the first sales records and the second sales records.

* * * * *